US009779624B2

(12) United States Patent
Lefevre et al.

(10) Patent No.: US 9,779,624 B2
(45) Date of Patent: Oct. 3, 2017

(54) METHOD AND SYSTEM OF DRIVING ASSISTANCE FOR COLLISION AVOIDANCE

(71) Applicants: Inria Institut National De Recherche En Informatique Et En Automatique, Le Chesnay (FR); The Regents of the University of California, Oakland, CA (US)

(72) Inventors: Stephanie Lefevre, Cugnaux (FR); Christian Laugier, Montbonnot Saint Martin (FR); Ruzena Bajcsy, Kensington, CA (US)

(73) Assignees: Inria Institut National De Recherche En Informatique Et En Automatique, Le Chesnay (FR); The Regents of the University of California, Oakland, CA (US)

( * ) Notice: Subject to any disclaimer, the term of this patent is extended or adjusted under 35 U.S.C. 154(b) by 0 days.

(21) Appl. No.: 15/033,425

(22) PCT Filed: Oct. 24, 2014

(86) PCT No.: PCT/EP2014/072908
§ 371 (c)(1),
(2) Date: Apr. 29, 2016

(87) PCT Pub. No.: WO2015/062994
PCT Pub. Date: May 7, 2015

(65) Prior Publication Data
US 2016/0275797 A1 Sep. 22, 2016

(30) Foreign Application Priority Data

Oct. 31, 2013 (EP) .................................. 13306495

(51) Int. Cl.
*G08G 1/16* (2006.01)
*B60Q 1/52* (2006.01)
(Continued)

(52) U.S. Cl.
CPC ............. *G08G 1/163* (2013.01); *B60Q 1/525* (2013.01); *B60Q 5/006* (2013.01); *G08G 1/166* (2013.01);
(Continued)

(58) Field of Classification Search
None
See application file for complete search history.

(56) References Cited

U.S. PATENT DOCUMENTS

| 2003/0139883 A1 | 7/2003 | Takafuji et al. | |
| 2012/0143488 A1* | 6/2012 | Othmezouri | B60T 7/22 701/301 |

FOREIGN PATENT DOCUMENTS

DE 10257842 A1 11/2003

OTHER PUBLICATIONS

Stephanie Lefevre, et al., "Evaluating Risk at Road Intersections by Detecting Conflicting Intentions", Proceedings of IEEE/RSJ International Conference on Intelligent Robots and Systems, Oct. 2012, 6 pages.
(Continued)

Primary Examiner — Leon-Viet Nguyen
(74) Attorney, Agent, or Firm — Maynard Cooper & Gale, P.C.; Brian T. Sattizahn

(57) ABSTRACT

The invention concerns a method of driving assistance for assisting a human driver in safely driving a vehicle called host vehicle, implemented by a processor on board of said host vehicle. The host vehicle comprises means for obtaining first information relative to the host vehicle and means for obtaining second information relative to at least one other vehicle in a neighborhood of the host vehicle, said first and second information being obtained at regular time instants, comprising triggering an intervention of a collision avoidance system. The method comprises a step (51) of intervention decision adapted to decide whether to trigger the intervention of the collision avoidance system at a current time instant ($T_c$) or to postpone said intervention decision at a later time instant ($T_l$) depending upon additional first and second information to be acquired between the current time instant ($T_c$) and the later time instant ($T_l$), said additional first and second information having an associated probability. The invention also concerns an associated system of driving assistance.

9 Claims, 3 Drawing Sheets

(51) Int. Cl.
 *B60Q 5/00* (2006.01)
 *B60W 30/08* (2012.01)
(52) U.S. Cl.
 CPC ....... *B60G 2800/242* (2013.01); *B60W 30/08* (2013.01)

(56) References Cited

OTHER PUBLICATIONS

Nicolas Saunier, et al., "Probabilistic Collision Prediction for Vision-Based Automated Road Safety Analysis,"Proceedings of IEEE Intelligent Transportation Systems Conference, Nov. 2007, 7 pages.

* cited by examiner

METHOD AND SYSTEM OF DRIVING ASSISTANCE FOR COLLISION AVOIDANCE

STATEMENT REGARDING FEDERALLY SPONSORED RESEARCH OR DEVELOPMENT

This invention was made with government support under Grant No. 1239323 awarded by the National Science Foundation. The government has certain rights in the invention.

The present invention concerns a method of driving assistance for assisting a human driver in safely driving a vehicle called host vehicle, implemented by a processor on board of said host vehicle, and an associated driving assistance system.

The field of the invention is the field of active safety systems implemented in vehicles.

It is a constant necessity to improve the safety on road and to prevent accidents. Nowadays, vehicles, such as personal cars, are equipped with various sensors which allow obtaining first information relative to the position of the vehicle's position and motion, when used in combination with road maps databases. Further, vehicles may be equipped with additional sensors which provide second information about other vehicles travelling on neighbouring roads, which are called neighbouring vehicles. Such additional sensors include lidars, radars and cameras. Alternatively, vehicles may be adapted to receive information on the position and motion of other vehicles travelling in the neighbourhood, provided by distant sensors.

The purpose of active safety systems is to avoid or mitigate accidents through driver warnings or direct actions on the commands of the vehicles, such as braking and steering. The principle of active safety systems is, in general, to implement a safety assessment module based on the first information about the host vehicle and the second information about other vehicles, and provide an estimate of the true state of the traffic situation to a risk assessment module, adapted to compute the collision risk of the situation. The traffic situation designates the state of the host vehicle and of other vehicles in the neighborhood at given time instants.

The collision risk is provided to a decision making module, adapted to decide on the intervention by a collision avoidance system and an associated action, such as a warning to the driver or an automatic intervention, such as automatically braking for example.

In known methods, an indicator called Time-to-Collision, which corresponds to an estimated time before a collision occurs, is used by the decision making module to decide whether to intervene or not.

A problem encountered is that the indicator Time-to-Collision is uncertain, and however, the safety must be ensured. In terms of security, an intervention should be triggered relatively early, so as to ensure that a collision is avoided, for example when raising an alarm, it is necessary to ensure that the driver will have enough time to react, for example to brake, before an actual collision occurs. However, in case of early intervention, a high rate of false alarms may occur. Such a high rate of false alarms is likely to be detrimental to the driver's acceptance of the system.

It is an object of the present invention to provide a method and system to provide driving assistance while limiting the false alarm rate of intervention of a collision avoidance system and while, at the same time, preserving a high level of security ensuring that the intervention is in time to avoid accidents.

To this end, the invention concerns, according to a first aspect, a method of driving assistance for assisting a human driver in safely driving a vehicle called host vehicle, implemented by a processor on board of said host vehicle, the host vehicle comprising means for obtaining first information relative to the trajectory of the host vehicle and means for obtaining second information relative to the trajectory of at least one other vehicle in a neighborhood of the host vehicle, said first and second information being obtained at regular time instants, comprising collision risk assessment and triggering an intervention of a collision avoidance system. The method comprises a step of intervention decision adapted to decide whether to trigger the intervention of the collision avoidance system at a current time instant or to postpone said intervention decision at a later time instant depending upon additional first and second information to be acquired between the current time instant and the later time instant. The intervention decision takes into account a first expected cost of decision based upon first and second information acquired up to current time instant and a second expected decision cost computed using probabilities of said additional first and second information to be acquired between the current time instant and the later time instant, to ensure that a postponement is likely to decrease the probability of unnecessary intervention.

The method of the invention further comprises features as recited in claims 2 to 9, taken independently or in combination.

According to a second aspect, the invention concerns a driving assistance system for assisting a human driver in safely driving a vehicle called host vehicle, comprising a host vehicle equipped with an on-board processing unit, the host vehicle comprising means for obtaining first information relative to the trajectory of the host vehicle and means for obtaining second information relative to the trajectory of at least one other vehicle in a neighborhood of the host vehicle, said first and second information being obtained at regular time instants, said on-board processing unit comprising a decision making unit adapted to trigger an intervention of a collision avoidance system. The system further comprises means for intervention decision adapted to decide whether to trigger the intervention of the collision avoidance system at a current time instant or to postpone said intervention decision at a later time instant depending upon additional first and second information to be acquired between the current time instant and the later time instant. The intervention decision takes into account a first expected cost of decision based upon first and second information acquired up to current time instant and a second expected decision cost computed using probabilities of said additional first and second information to be acquired between the current time instant and the later time instant, to ensure that a postponement is likely to decrease the probability of unnecessary intervention.

The invention will be better understood in the light of the detailed description and accompanying drawings listed below, which are only exemplary and by no way limiting:

FIG. 1 illustrates a traffic scene 1 in which there is a risk of collision, and in which a driving assistance system and method according to the invention finds an application.

Figure 1:
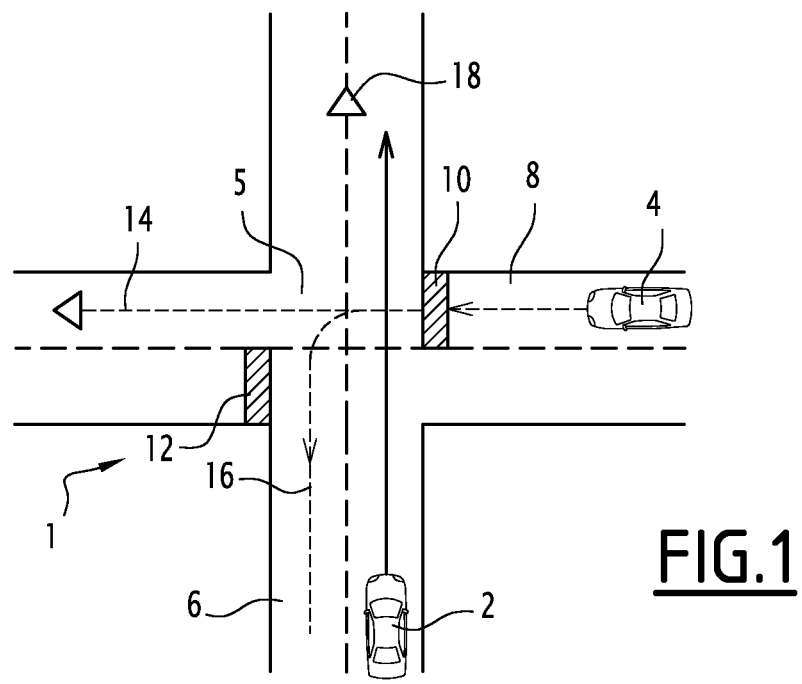
FIG. 1 represents schematically a scenario of application of a driving assistance system.

In the traffic scene 1, two vehicles 2 and 4 are advancing toward a two-way stop road intersection 5 between a first road 6 and a second road 8. The vehicles on the second road 8 are supposed to stop at the intersection 5, as indicated, according to usual road marking signs, by indications 10, 12.

In the scene of FIG. 1, it is supposed that vehicle 2 is the host vehicle, also called ego-vehicle, comprising a driving assistance system. The vehicle 4 is another vehicle in a predetermined neighbourhood of vehicle 2, called other vehicle or neighbouring vehicle.

The situation represented in FIG. 1 is a normal traffic situation, considering that both vehicles 2 and 4 have straight trajectories on their respective roads, however several scenarios at the intersection 5 may be envisaged, and some of the scenarios may lead to a collision.

In a first scenario S1, the host vehicle 2 advances at a constant speed on road 6, according to normal driving conditions respecting the traffic rules, while the other vehicle 4 does not respect the stop indication 10 and continues to run straight on according to trajectory 14. In this first scenario S1, a collision may occur between vehicles 2 and 4 at the intersection 5, depending on their respective speed.

According to a second scenario S2, the host vehicle 2 advances at a constant speed on road 6, while the other vehicle 4 turns left onto road 6 according to the trajectory 16, without respecting the stop indication 10. In this second scenario S2 also a collision may occur between vehicles 2 and 4 at the intersection 5, depending on their respective speeds.

According to a third scenario S3, the host vehicle 2 advances at a constant speed on road 6, while the other vehicle 4 turns right onto road 6 according to the trajectory 18, without respecting the stop indication 10. In this third scenario S3 also a collision may occur between vehicles 2 and 4 at the intersection 5, depending on their respective speeds.

According to a fourth scenario S4, the host vehicle 2 advances at a constant speed on road 6, while the other vehicle 4 stops according to stop indication 10. No collision is likely to occur in this fourth scenario.

A driving assistance system, on board of the host vehicle 2, is able to intervene to avoid a probable collision, by either raising an alarm via a human-machine interface or by automatically braking so as to avoid a potential collision. More generally, a driving assistance system is adapted to trigger an automatic action so as to avoid the collision, depending on the situation assessment.

Figure 2:
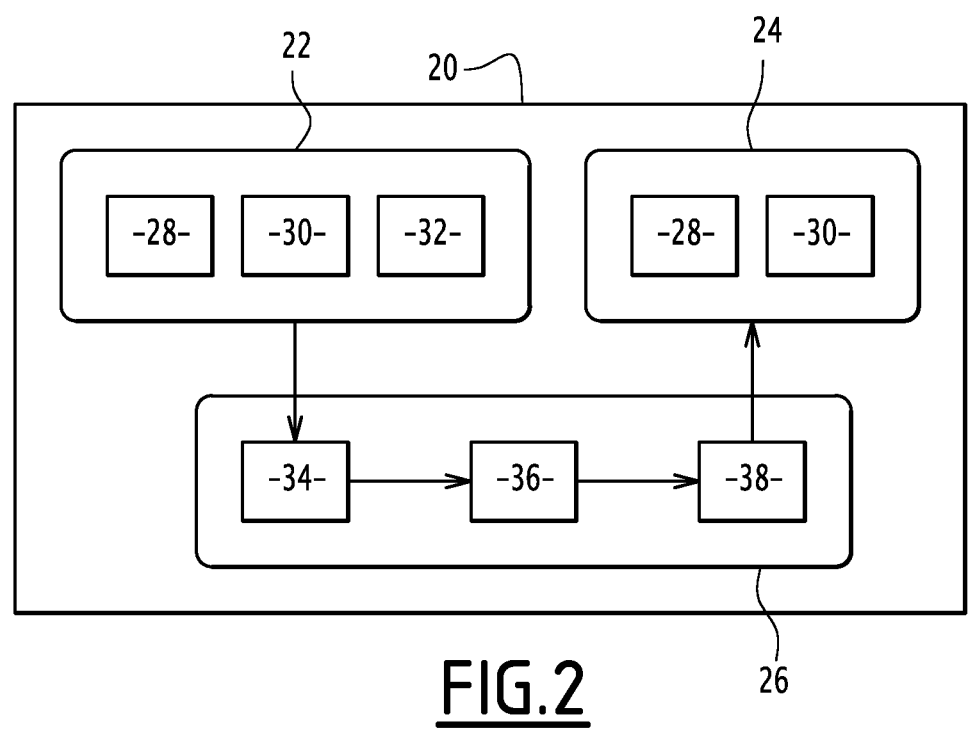
FIG. 2 is a functional block diagram of a driving assistance system.

A driving assistance system 20 comprises, as schematically illustrated in FIG. 2, input modules 22, output modules 24 and processing modules 26.

The input modules 22 comprise a number of sensors 28, for example GPS ("global positioning system") sensors, for sensing the position, orientation and speed of the host vehicle itself in cooperation with databases 30 storing roadmap information.

Additionally, the sensors 28 may comprise an Inertial Measurement Unit (IMU), which measures the relative displacement of the host vehicle and provides, in cooperation with the GPS system, a more reliable information of position, speed and orientation of the host vehicle at each measuring time instant.

More generally, the sensors 28 in cooperation with databases 30 provide a set of first information, at regular time instants, for example every 200 milliseconds, relative to the travelling, i.e. the trajectory, of the host vehicle 2 on the road 6.

The input modules 22 further comprise, in an embodiment, communication means 32 adapted to receive second information at regular time instants, for example every 200 milliseconds, relative to the trajectory of the other vehicle. Such second information may be transmitted by the other vehicle 4 via vehicle-to-vehicle communication.

The input modules 22 provide therefore first and second information, at regular time instants, about the general traffic situation, that is to say the relative position, orientation and speed of the host vehicle and the other vehicles travelling in the neighbourhood of the host vehicle.

In an embodiment, each first and second information is stored in the form of an information vector $\bar{z}_T^n = (z_{t_k}^n)$, $t_0 < t_k < T$, each element $z_{t_k}^n$ being a triplet comprising the position, the orientation and the speed of the n-th vehicle considered at the time instant $t_k$.

In the example of FIG. 1, the first information relative to the host vehicle 2 up to a current time instant $T_c$ can be denoted $\bar{z}_{T_c}^1 = (z_{t_k}^1)$, $t_0 < t_k < T_c$, and the second information relative to the other vehicle 4 up to a current time instant $T_c$ can be denoted: $\bar{z}_{T_c}^2 = (z_{t_k}^2)$, $t_0 < t_k < T_c$.

The input modules 22 communicate the first and second information to the situation assessment module 34 of the processing modules 26.

The processing modules 26 are for example implemented by a processor of an on-board computer. In an embodiment, a dual-core processor is used.

More generally, an on-board processing unit such as a programmed microprocessor or microcontroller, an ASIC or other integrated circuit, is used.

The situation assessment module 34 fuses the first and second information received from input modules 22 and provides an estimate of the true state of the host vehicle and its environment, the environment comprising the vehicle in the neighbourhood of the host vehicle, according to a given model of road traffic. For example, as explained in further detail hereafter, in an embodiment, the traffic situation is modelled by a Dynamic Bayesian Network (DBN). A risk assessment module 36 processes the estimate of the true state of the host vehicle and its environment provided by the situation assessment module 34 and computes a collision risk, for example in the form of a probability of collision at a time instant t, t being later than the current time instant $T_c$ when the computation is carried out.

It is to be noted that in the example detailed, only one other vehicle 4 in the neighbourhood of the host vehicle 2 is considered. However, the invention is in no way limited to a single other vehicle, and several other vehicles in a given neighbourhood of the host vehicle can be considered, and a collision risk assessment with any of the other vehicles shall be computed.

The computed collision risk is transmitted to a decision making module 38, which implements an intervention decision adapted to decide whether to trigger an intervention at current time $T_c$ or to postpone the intervention decision to a later time $T_f = T_c + dt$, where dt is preferably comprised between 100 and 1000 milliseconds, and for example equal to 200 milliseconds.

The decision making module 38 is adapted to control the intervention of the collision avoidance system, by sending a control order to the output modules 24, either ordering an automatic action to the actuators module 40 or ordering the raising of an alarm, either a visual alarm or a sound alarm, by a human-machine interface module 42.

Figure 3:
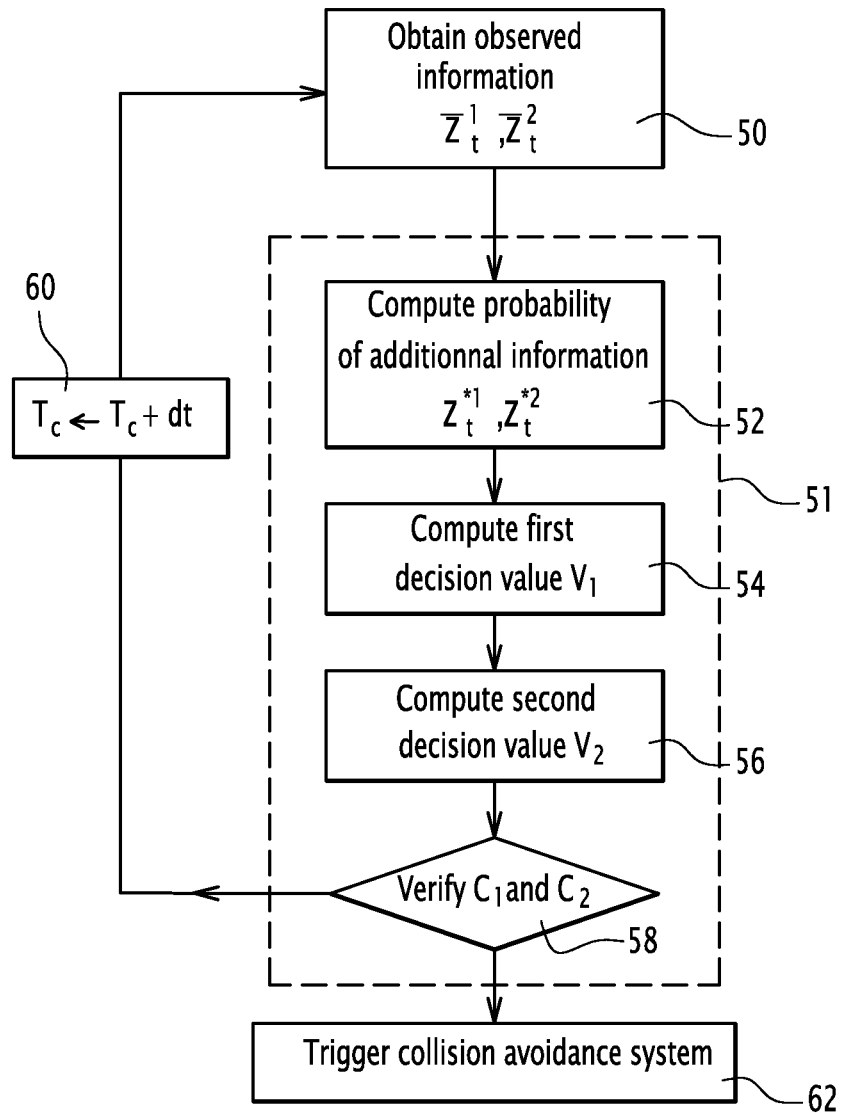
FIG. 3 is a flowchart of a method implemented by an intervention decision module according to the invention.

FIG. 3 is a flowchart of the main steps of a method of driving assistance according to an embodiment of the invention, as implemented by a driving assistance system 20 on-board of a host vehicle 2, and in particular by the decision making module 38 in cooperation with the risk assessment module 36.

In an information obtaining step 50, observed measurements provided by the input modules 22, comprising first information $\bar{z}_t^1$ relative to the host vehicle 2 up to the current time instant $T_c$ and second information $\bar{z}_t^2$ relative to another vehicle 4 in the neighbourhood of vehicle 2 up to the current time instant $T_c$ are acquired.

It is to be noted that several other vehicles may be considered, in which case the second information comprises information sets $\bar{z}_t^2$ to $\bar{z}^{N+1}$ to N other vehicles. For the simplicity of explanation, only one other vehicle is mentioned.

The first and second information acquired are available measurements relative to the vehicles, for example observed every 200 milliseconds during a time period of $[T_c-\Delta, T_c]$ of duration $\Delta$. For example, at each time instant $t \in [T_c-\Delta, T_c]$, the position, orientation and speed of each vehicle are observed and recorded by the input modules 22 as explained above.

The method of the invention is preferably used in a scenario in which according to a classical optimality criterion, such as a decision cost function, an intervention of the collision avoidance system would be chosen at current time $T_c$, based on the observed measurements provided by the input modules 22. A step 51 of intervention decision adapted to decide whether to trigger an intervention by the on-board output modules 24 at the current time instant $T_c$ or to postpone the decision at a later time instant $T_l$, is implemented by carrying out steps 52 to 58.

At step 52, probabilities of additional first information $z_t^{*1}$ and additional second information $z_t^{*2}$ with $t \in [T_c, T_l]$, to be acquired between the current time instant $T_c$ and the later time instant $T_l=T_c+dt$, are computed. The additional information is of the same nature as the observed information, in particular position, orientation and speed of each vehicle, but not yet observed at current time $T_c$. The first and second additional information have associated probability distributions.

At the following step 54, a first decision value $V_1$ is computed, which is dependent on the expected additional first and second information. The first decision value $V_1$ depends upon the probabilities of additional information computed in previous step 52, as well as on a probability of collision between the host vehicle 2 and each other vehicle considered, computed at current time instant $T_c$, and on the estimated probabilities of collision between the host vehicle 2 and each other vehicle considered taking into account the additional information $z_t^{*1}$, $z_t^{*2}$.

The probability of collision at a given time T is to be understood as the probability of a collision occurring between the host vehicle 2 and any other vehicle considered between time T and a future time instant $T+T_h$, where $T_h$ is a time lapse of the order of a few seconds.

On the principle, the first decision value $V_1$ is representative of the expected benefit of making a decision with additional information to be acquired during a future time interval until a later time instant $T_l$.

At the following step 56, a second decision value $V_2$ representative of the expected cost of postponing the intervention decision until the later time instant $T_l$ is computed.

Once the two decision values are computed, the verification step 58 applies a first decision criterion $C_1$ based on the first decision value $V_1$ and a second decision criterion $C_2$ based on the second decision value $V_2$.

The first criterion $C_1$ is designed to ensure that the decision to postpone the intervention is likely to have a positive impact, or in other terms, the additional information is likely to decrease the probability of false alarm, which is the probability of unnecessary intervention in the present case.

The second decision value $V_2$ and the second criterion $C_2$ are designed to ensure that the postponing of the decision does not change the situation of the host vehicle in terms of safety. That is to say, the probability that a potential collision can be avoided by triggering an intervention of the collision avoidance system at the later time instant $T_l$ is not lower than the probability that a potential collision can be avoided by triggering an intervention of the collision avoidance system at time $T_c$.

In other words, the second criterion $C_2$ ensures that even if the intervention decision is postponed until the later time instant $T_l$, the same safety conditions apply for the host vehicle.

In case of positive verification of both criteria, the intervention decision is postponed to the later time $T_l$. The current time $T_c$ is set to $T_c+dt$ in step 60, and when the current time is reached, step 60 is followed by the information obtaining step 50 already described.

In case of negative verification of both criteria, so if either the first decision criterion $C_1$ and/or the second decision criterion $C_2$ is not verified, then step 58 is followed by step 62 of triggering a collision avoidance system.

In case of intervention of the collision avoidance system, two alternatives are envisaged:

In a first alternative, an actuator 40 is triggered to take over the command of the host vehicle and to apply a correction action automatically, such as the braking.

In a second alternative, an alarm is raised, either a visual alarm or a sound alarm, via the human-machine interface module 42.

The type of intervention 62 envisaged is taken into account in the step 52 of computing a second decision value $V_2$.

Figure 4:
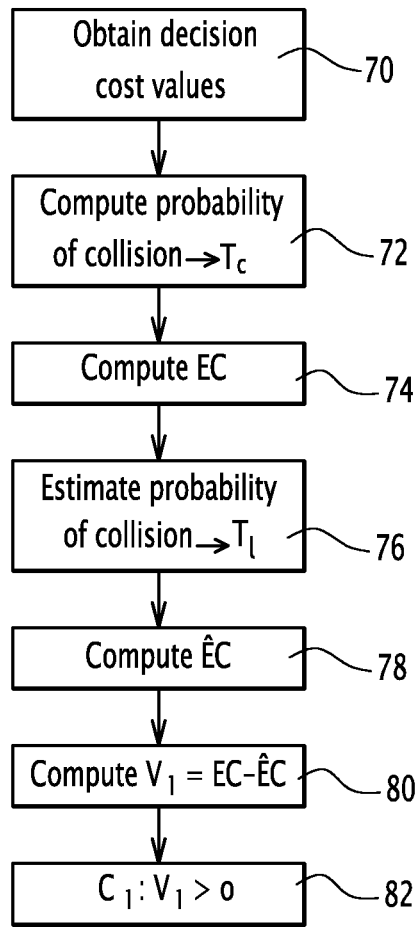
FIG. 4 is a flowchart of a method of determining a first decision value according to an embodiment of the invention.

According to a preferred embodiment, the first decision value $V_1$ is computed by applying the statistical theory of decision making with additional information, by implementing a calculation method comprising the steps schematically represented in FIG. 4.

The situation of the host vehicle can be modelled as follows. During a given time period $[T_c, T_l]$, two possible events are to be considered: the occurrence or the non-occurrence of a collision with another vehicle within a time lapse $T_h$ from the current time instant $T_c$.

Therefore, a set of possible events or state of nature is $S=\{\text{collision}, \neg\text{collision}\}$.

The decision to be taken concerns two possible actions, which are the intervention or the non intervention of the collision avoidance system.

Therefore, a set of possible actions is $A=\{\text{intervene}, \neg\text{intervene}\}$.

A cost function is associated to each decision to intervene or not to intervene, depending on the occurrence or not of a collision, as follows:

$$c(s, a) = \begin{cases} 0 & \text{if } s = \text{collision}, a = \text{intervene} \\ ct_1 & \text{if } s = \neg\text{collision}, a = \text{intervene} \\ ct_2 & \text{if } s = \text{collision}, a = \neg\text{intervene} \\ 0 & \text{if } s = \neg\text{collision}, a = \neg\text{intervene} \end{cases} \quad (\text{Eq 1})$$

The cost values $ct_1$ and $ct_2$ are parameters of the decisions, and they are provided as an input for the calculation of the first decision value $V_1$, in an initialization step 70.

Preferably, the cost values $ct_1$ and $ct_2$ are linked by the following formula:

$$ct_1 = \frac{\lambda}{1-\lambda} \times ct_2, \quad (Eq\ 2)$$

With $\lambda$ comprised between 0 and 1, for example $\lambda=0,3$, $ct_1=42.9$, $ct_2=100$.

The first decision value $V_1$ is computed according to the formula:

$$V_1 = EC(T_c) - E\hat{C}(T_l) \quad (Eq\ 3)$$

where $EC(T_c)$ is a first expected cost of decision using only the information provided by the input modules 22 available at current time instant $T_c$, and $E\hat{C}(T_l)$ is a second expected cost of decision using the information provided by the input modules 22 available at current time instant $T_c$ and additional information that would be obtained between $T_c$ and the later time instant $T_l=T_c+dt$.

In order to compute the first expected cost $EC(T_c)$, the probability of collision given the information provided by the input modules up to the current time instant $T_c$, $P(s|z_{r0:Tc})$ is computed in following step 72. The notation $z_{r0:Tc}$ designates the information from the input modules 22 between a starting time instant $t_0$, for example $t_0=0$, and the current time instant $T_c$, for the host vehicle and for the other vehicles considered.

Next, the first expected cost $EC(T_c)$ is computed in step 74 using the following formula:

$$EC(T_c) = \min_a \sum_s c(s,a) \times P(s \mid z_{r0:Tc}) \quad (Eq\ 4)$$

Equation (Eq 4) gives the cost of the decision a taken in the set A={intervene, ¬ intervene} that minimizes the overall decision cost based on the available information at the current time instant $T_c$.

Next, an estimate of the probability of collision $P(s|z_{r0:Tl})$ given additional information up to the later time instant $T_l$ is computed in step 76. The notation $Z_{r0:Tt}$ designates the information from the input modules 22 between a starting time instant $t_0$ and the current time instant $T_c$, and additional information between the current time $T_c$ and the later time instant $T_l$. A random variable $Z_{Tl}$ represents the information relative to the vehicles provided by the input modules 22 at time instant $T_l$.

Finally, at step 78, the second expected cost of decision $E\hat{C}(T_l)$ is computed as follows:

$$E\hat{C}(T_l) = \int_{z_{Tl}} P(z_{Tl}) \times \left[ \min_a \sum_s c(s,a) \times P(s \mid z_{t0:Tl}) \right] dZ_{Tl} \quad (Eq\ 5)$$

The above formula uses the probability of observation of information $z_{Tl}$, $P(z_{Tl})$, at time instant $T_l$.

In an alternative embodiment, the information relative to the vehicles provided by the input modules is represented by a discrete random variable $Z_{Tl}$, and the second expected cost of decision $E\hat{C}(T_l)$ is computed as follows:

$$E\hat{C}(T_l) = \sum_{z_{Tl}} p(z_{Tl}) \times \left[ \min_a \sum_s c(s,a) \times P(s \mid z_{t0:Tl}) \right] \quad (Eq\ 6)$$

Next, at step 80, the first decision value $V_1$, which is the expected value of additional information according to the statistical decision making, is computed, according to formula (Eq 3).

The first decision criterion $C_1$ associated to the first decision value $V_1$ is set to $V_1>0$ in step 82. So if $V_1$ is greater than zero, the first decision criterion $C_1$ is verified, the additional information is expected to have a positive effect on the decision.

Figure 5:
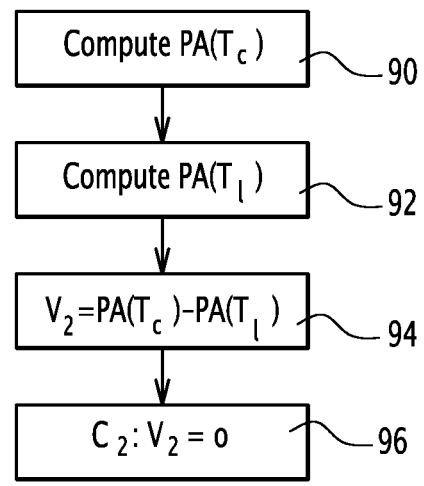
FIG. 5 is a flowchart of a method of determining a second decision value according to an embodiment of the invention.

The second decision value $V_2$ is computed, according to a preferred embodiment, according to the method illustrated in FIG. 5.

In a first step 90, the probability $PA(T_c)$ that the collision avoidance system is able to avoid a collision by an intervention at the current time instant $T_c$ is computed.

In a second step 92, the probability $PA(T_l)$ that the collision avoidance system is able to avoid a collision by an intervention at the later time instant $T_l$ is computed.

It is to be noted that the steps 90 and 92 may be carried out in parallel.

The second decision value $V_2$ is computed as the difference between the probability values $PA(T_c)$ and $PA(T_l)$ previously computed.

The second decision criterion $C_2$ associated to the second decision value is $V_2=0$, so as to ensure that the probability of collision avoidance is not lower at the later time $T_l$ than at the current time $T_c$.

Several models can be implemented to carry out the probabilities estimations of steps 52, 72, 76, 90 and 92.

According to a first embodiment, the model of road traffic is a joint motion of vehicles in a traffic scene modelled by a Dynamic Bayesian Network (DBN), as proposed in the article "Evaluating risk at road intersections by detecting conflicting intentions", by S. Lefèvre, C. Laugier and J. Ibañez-Guzman, published in Proc. IEEE/RSJ International Conference on Intelligent Robots and Systems, 2012, pp. 4841-4846.

The DBN proposed takes into account, for each vehicle considered:

an intended maneuver of the driver, represented by a random variable $I_t^n$ designating the intended maneuver of the driver of vehicle n at time t;

an expected maneuver, following the traffic rules, represented by a random variable $E_t^n$ designating the expected maneuver of the driver of vehicle n at time t;

the physical state of the vehicle, such as position, speed and orientation, represented by a random variable noted $\Phi_t^n$ for vehicle n at time t;

the information obtained by the sensors of the input modules 22 by measurement, represented by a random variable noted $Z_t^n$ for vehicle n at time t.

The random variables $I_t^n$, $E_t^n$ and $\Phi_t^n$ are hidden variables, whereas $Z_t^n$ is observable.

In the general case, N vehicles including the host vehicle are considered.

For simplicity of notations, the conjunction of variables for N vehicles is represented in a factored form:

$$X\neg(X^1 \ldots X^N)$$

Each $X^n$ being associated with a vehicle n.

A given state vector at time t is defined as: $\theta_t = (E_t, I_t, \Phi_t)$, where a possible value is considered for each variable $I_t^n$, $E_t^n$ and $\Phi_t^n$.

The joint distribution can be defined as follows:

$$P(E_{0:T} I_{0:T} \Phi_{0:T} Z_{0:T}) = \qquad (\text{Eq 7})$$

$$P(E_0 I_0 \Phi_0 Z_0) \times \prod_{t=1}^{T} \times \prod_{n=1}^{N} [P(E_t^n \mid I_{t-1} \Phi_{t-1}) \times$$

$$P(I_t^n \mid I_{t-1}^n E_t^n) \times P(\Phi_t^n \mid \Phi_{t-1}^n I_t^n) \times P(Z_t^n \mid \Phi_t^n)].$$

which corresponds to a classic Markov state-space model linking $I_t^n$, $\Phi_t^n$ and $Z_t^n$, augmented by the expected maneuver $E_t^n$ which is derived from the previous situational context $(I_{t-1} \Phi_{t-1})$ and has an influence on the intended maneuver $I_t^n$.

The probability density function of the hidden variables $I_t$, E, and $\Phi_t$ is approximated by a set of weighted samples called particles, each particle being associated to a given state $\theta_t$.

The set of Np particles, where for example Np=400, at time t is denoted:

$\{H_{i,t}, w_{i,t}\}_{i=1:Np}$ with $H_{i,t} = (I_t E_t \theta_t)$ the state of particle i at time t and $w_{i,t}$ the weight of particle i at time t.

The probability of collision between time Tc and time Tc+Th, taking into account the information observed for all vehicles as from $t_0$, is computed as the probability that the intention of drivers differs from what is expected:

$$P(s=\text{collision}|z_{r,0:Tc}) = P(\exists n: I_T^n \neq E_{Tc}^n | z_{r,0:Tc}) \qquad (\text{Eq 8})$$

Using the particle filter, the probability of collision as defined in the formula (Eq 8) above can be computed by summing up the weights of the current particles j that verify the condition j: $(\exists n: I_{Tc}^n \neq E_{Tc}^n)$:

$$P(s = \text{collision} \mid z_{t0:Tc}) = \sum_j w_{j,t} \qquad (\text{Eq 9})$$

The formula of (Eq 9) is used in step 72 to compute the probability of collision given the information gathered until the current time $T_c$.

To compute the probability distribution of the additional information and the probability of collision taking into account probabilistic additional information, the probabilistic motion model described is used as follows.

The probability distribution of the future observations between the current time $T_c$ and the later time $T_l$ can be calculated in two steps. The first step is to execute the prediction step in the particle filter to obtain a probability distribution on $\theta_{t+1}$.

The second step is to use a model of the sensors of the input modules 22 $P(Z|\theta)$ to compute the probability distribution of the additional information $z_{Tl}$ that will be observed. The computation is carried out for each vehicle considered, so the computation step 52 is completed. A probability distribution of the first and second additional information is obtained, with one possible observation $z_{Tl}$ per particle.

Next, the collision probability at the later time $T_l$ is computed by, firstly, updating the particle filter with observations $z_{Tl}$ for each particle.

Secondly, the probability of collision is computed in an analogous manner to the calculation explained above, by summing up the weights of the particles k which verify the condition: k: $(\exists n: I_{Tl}^n \neq E_{Tl}^n)$.

$$P(s = \text{collision} \mid z_{t0:Tl}) = \sum_k w_{k,Tl} \qquad (\text{Eq 10})$$

The formula of (Eq 10) is used to compute an estimate of a probability of collision in step 76 in this first embodiment.

The probabilistic DBN motion model is also used to calculate the probabilities $PA(T_c)$ and $PA(T_l)$ of collision avoidance at current time instant $T_c$ and at the later time instant $T_l$ used in the calculation of the second decision value $V_2$.

Firstly, a time-to-collision TTC(t) at time instant t is defined as the time left until a collision occurs between the host vehicle 2 and another vehicle 4 if both vehicles continue on the same course and at the same speed, that is to say on the same trajectory. The time-to-collision $TTC(T_c)$ can be calculated, at the current time instant $T_c$, for a given state $\theta_{Tc}$.

Further, the time-to-collision $TTC(T_l)$ at the later time instant $T_l$ can be also calculated at the current time, while conserving the hypothesis of the same trajectory, i.e. same course and same speed.

A time-to-stop TTS(t) at time instant t is defined as the time needed for the host vehicle to reach a full stop when the collision avoidance system is triggered at time t. The time-to-stop TTS(t) depends on the type of intervention implemented by the collision avoidance system.

If an automatic braking is triggered by the collision avoidance system, the time-to-stop is computed for example as follows:

$$TTS(t) = \frac{s_t}{\delta} + T_m \qquad (\text{Eq 11})$$

Where $s_t$ is the speed of the host vehicle at time t, $\delta$ is the deceleration applied by the collision avoidance system, for example $\delta = 7$ m/s² and $T_m$ is the average braking system response, for example $T_m = 0.4$ s (seconds).

If the collision avoidance system triggers an alarm for warning the driver, the driver's response time has to be also taken into account, and the time-to-stop can be estimated as:

$$TTS(t) = \frac{s_t}{\delta} + T_m + T_r \qquad (\text{Eq 12})$$

where $T_r$ is the driver's average reaction time, for example $T_r = 1.4$ s (seconds).

The formula (Eq 12) is then used to compute the time-to-stop $TTS(T_c)$ at the current time instant $T_c$, and also the time-to-stop $TTS(T_l)$ at the later time instant $T_l$.

To compute the $TTS(T_l)$, the host vehicle speed at the later time instant $T_l$ is predicted from the host vehicle speed at current time instant $T_c$, considering that the vehicle continues on the same trajectory.

In an embodiment, the speed is supposed to remain constant, so that $s_{Tl} = s_{Tc}$.

In an alternative embodiment, the level of deceleration of the host vehicle at the current time is used to predict the vehicle's speed at the later time instant $T_l$.

The probability $PA(T_c)$ that a collision can be avoided by triggering the collision avoidance system at the current time instant $T_c$ is computed, in this embodiment of the invention, by computing the values of $TTC(T_c)$ and $TTS(T_c)$ for each particle, and by summing the weights of the current particles i that verify the condition i:$(TTC(T_c)>TTS(T_c))$.

$$PA(T_c) = \sum_i w_{i,Tc} \qquad \text{(Eq 13)}$$

The probability $PA(T_l)$ that a collision can be avoided by triggering the collision avoidance system at the later time instant $T_l$ is computed, in this embodiment of the invention, by computing the values of $TTC(T_l)$ and $TTS(T_l)$ for each particle, and by summing the weights of the current particles j that verify the condition j: $(TTC(T_l)>TTS(T_l))$:

$$PA(T_l) = \sum_j w_{j,Tl} \qquad \text{(Eq 14)}$$

Then the second decision value is computed as indicated with reference to step 94, by subtracting the values obtained by applying the formulas (Eq 13) and (Eq 14).

According to a second embodiment of the invention, a different non Bayesian traffic model is used to carry out the probabilities estimations of steps 52, 72, 76, 90 and 92.

The traffic model proposed in the article "Probabilistic Collision Prediction for Vision-Based Automated Road Safety Analysis", by N. Saunier et al, published in the Proceedings of the IEEE Intelligent Transportation Systems Conference, 2007, is used.

In this second embodiment, the probability of collision between two vehicles at a given time instant T is based on various extrapolation hypothesis. For a road situation including a host vehicle and another vehicle in the neighbourhood, for each vehicle, based on the observed information up to the current time instant $T_c$, a set of extrapolation hypothesis is obtained. The extrapolation hypothesis and their associated probabilities are obtained in a prior learning phase.

The probability of collision between time Tc and time Tc+Th is then computed at current time instant $T_c$ using the following formula:

$$P(s = \text{collision} \mid z_{t0:Tc}) = \sum_{i,j} P(Q_i \mid z_{t0:Tc}) P(Q_j \mid z_{t0:Tc}) \times e^{\frac{\Delta_{i,j}^2}{2\sigma^2}} \qquad \text{(Eq 15)}$$

Where $Q_i$ represents the set of extrapolation hypothesis for the host-vehicle, and $Q_j$ is the set of extrapolation hypothesis for the other vehicle, $\Delta_{i,j}=t_{i,j}-T_c$ where $t_{i,j}$ is the predicted time of collision between the host vehicle and the other vehicle with extrapolation hypothesis $Q_i$, $Q_j$, and $\sigma$ is a constant value, for example chosen equal to the average user reaction time $T_r$.

The formula (Eq 15) is used to compute an estimate of a probability of collision in step 72 in this second embodiment.

A probability of additional information to be obtained between the current time instant $T_c$ and the later time instant $T_l$ is computed from the learnt probabilities of extrapolation hypothesis, a set of additional information corresponding to each extrapolation hypothesis.

The extrapolation hypothesis for each vehicle, based on the observed information up to the current time instant $T_c$ can be extended to the later time instant $T_l$ so as to compute the probability of collision at the later time $T_l$ in an analogous manner to the calculation of the probability of collision at current time $T_c$.

Therefore, the formula (Eq 15) is adapted to compute the probability of collision at later time instant $T_l$ of step 76.

Finally, for each extrapolation hypothesis, the probabilities of collision avoidance at current time instant $T_c$ and at later time instant $T_l$ are computed, for example by assuming that all the vehicles will keep their speed constant, and subsequently the respective probabilities of collision avoidance are computed.

Advantageously, the invention provides a method for postponing a decision of intervention depending on additional information to be acquired between the current time instant and a later time instant.

The invention claimed is:

1. A method of driving assistance for assisting a human driver in safely driving a vehicle called host vehicle, implemented by a processor on board of said host vehicle, the host vehicle comprising means for obtaining first information relative to the trajectory of the host vehicle and means for obtaining second information relative to the trajectory of at least one other vehicle in a neighborhood of the host vehicle, said first and second information being obtained at regular time instants, comprising collision risk assessment and triggering an intervention of a collision avoidance system, the method being characterized in that it comprises a step of intervention decision adapted to decide whether to trigger the intervention of the collision avoidance system at a current time instant ($T_c$) or to postpone said intervention decision at a later time instant ($T_l$) depending upon additional first and second information to be acquired between the current time instant ($T_c$) and the later time instant ($T_l$), wherein the step of intervention decision comprises:
   a) computing a first decision value depending upon said additional first and second information,
   b) computing a second decision value depending upon a probability to avoid a collision between the host vehicle and any other vehicle if the collision avoidance system is triggered at said later time instant ($T_l$),
   c) verifying a first decision criterion depending on said first decision value and a second decision criterion depending on said second decision value, and
   d) deciding to trigger the collision avoidance system at current time instant ($T_c$) or postponing the intervention decision based on the outcome of the verification,
   the intervention decision taking into account a first expected cost of decision based upon first and second information acquired up to current time instant ($T_c$) and a second expected decision cost computed using probabilities of said additional first and second information to be acquired between the current time instant ($T_c$) and the later time instant ($T_l$) to ensure that a postponement is likely to decrease the probability of unnecessary intervention.

2. A method according to claim 1, wherein in case of decision to postpone the intervention, steps a) to d) are repeated, at the later time instant ($T_l$).

3. A method according to claim 1, wherein said first decision value is set to the difference between the first expected decision and the second expected decision cost.

4. A method according to claim 3, wherein the step of computing the first decision value comprises:
  computing a probability of collision, between the host vehicle and any other vehicle at current time instant ($T_c$),
  computing said first expected decision cost based upon the computed probability of collision.

5. A method according to claim 3, wherein the step of computing the first decision value further comprises:
  computing an estimate probability of collision, between the host vehicle and any other vehicle at the later time instant ($T_l$),
  computing said second expected decision cost based upon said estimate probability of collision between the host vehicle and any other vehicle at the later time instant ($T_l$), using the probabilities associated to the additional first and second information to be acquired between the current time instant ($T_c$) and the later time instant ($T_l$).

6. A method according to claim 4, wherein for the computing of a probability of collision at current time instant ($T_c$) and the computing of an estimate probability of collision at the later time instant ($T_l$), a joint motion of the host vehicle and of the at least one other vehicle is modeled by a dynamic Bayesian network.

7. A method according to claim 1, wherein the second decision value is set to the difference between a probability of collision avoidance by an intervention of the collision avoidance system at the current time instant ($T_c$) and a probability of collision avoidance by an intervention of the collision avoidance system at the later time instant ($T_l$).

8. A method according to claim 1, wherein said first information is a vector of data representative of a position, orientation and speed of the host vehicle at each time instant regularly sampled between a starting time instant and the current time instant ($T_c$), and said second information is a vector of data representative of a position, orientation and speed of each other vehicle at each time instant regularly sampled between a starting time instant and the current time instant ($T_c$).

9. System of driving assistance for assisting a human driver in safely driving a vehicle called host vehicle, comprising a host vehicle equipped with an on-board processing unit, the host vehicle comprising means for obtaining first information relative to the trajectory of the host vehicle and means for obtaining second information relative to the trajectory of at least one other vehicle in a neighborhood of the host vehicle, said first and second information being obtained at regular time instants, said on-board processing unit comprising a collision risk assessment unit and a decision making unit adapted to trigger an intervention of a collision avoidance system,
  the system being characterized in that it further comprises means for intervention decision adapted to decide whether to trigger the intervention of the collision avoidance system at a current time instant ($T_c$) or to postpone said intervention decision at a later time instant ($T_l$) depending upon additional first and second information to be acquired between the current time instant ($T_c$) and the later time instant ($T_l$), wherein the means for intervention decision is adapted to:
  a) compute a first decision value depending upon said additional first and second information,
  b) compute a second decision value depending upon a probability to avoid a collision between the host vehicle and any other vehicle if the collision avoidance system is triggered at said later time instant ($T_l$),
  c) verify a first decision criterion depending on said first decision value and a second decision criterion depending on said second decision value. and
  d) decide to trigger the collision avoidance system at current time instant ($T_c$) or postponing the intervention decision based on the outcome of the verification,
  the intervention decision taking into account a first expected cost of decision based upon first and second information acquired up to current time instant ($T_c$) and a second expected decision cost computed using probabilities of said additional first and second information to be acquired between the current time instant ($T_c$) and the later time instant ($T_l$), to ensure that a postponement is likely to decrease the probability of unnecessary intervention.

* * * * *